United States Patent [19]
Whitehouse

[11] 4,294,110
[45] Oct. 13, 1981

[54] TORQUE MEASURING SYSTEM FOR AN AIR TOOL

[75] Inventor: Hugh L. Whitehouse, Lyndhurst, Ohio

[73] Assignee: The Stanley Works, New Britain, Conn.

[21] Appl. No.: 93,111

[22] Filed: Nov. 13, 1979

[51] Int. Cl.³ .............................................. G01L 3/00
[52] U.S. Cl. ............................ 73/862.23; 73/862.27
[58] Field of Search ................. 73/136 R, 139; 173/8, 173/12

[56] References Cited

U.S. PATENT DOCUMENTS

| | | | |
|---|---|---|---|
| 2,867,117 | 1/1959 | Ernst | 73/139 |
| 3,656,560 | 4/1972 | Catterfeld et al. | 173/12 |
| 3,693,483 | 9/1972 | Palmer et al. | 173/12 X |
| 3,768,573 | 10/1973 | Jennings | 173/12 |
| 3,796,131 | 3/1974 | Workman et al. | 173/12 X |
| 4,006,784 | 2/1977 | Dudek | 173/12 |

*Primary Examiner*—James J. Gill
*Attorney, Agent, or Firm*—Hayes & Reinsmith

[57] ABSTRACT

A system for measuring torque applied by an air tool to a fastener during a fastening operation is disclosed wherein a torque indicating device is provided, preferably in a remote position from the tool, for sensing and indicating the torque applied to a fastener by the tool. In the preferred embodiments, an air pressure signal transmitter is connected between a motor inlet air passage and the torque indicating device for supplying a continuous air signal, indicative of fastener torque applied by the tool, to the torque indicating device during operation of the air tool.

4 Claims, 8 Drawing Figures

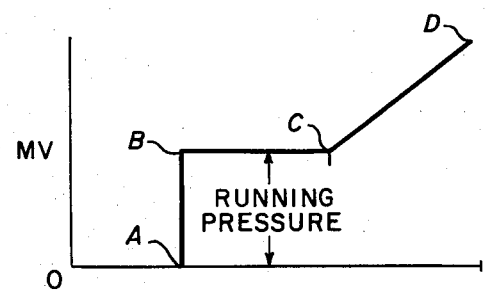
FIG. 6A
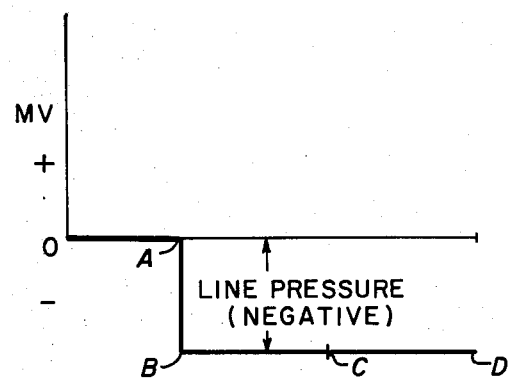
FIG. 6B
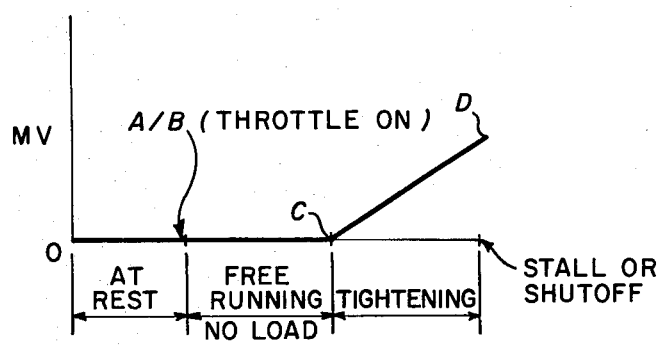
FIG. 6C
FIG. 6

TORQUE MEASURING SYSTEM FOR AN AIR TOOL

FIELD OF THE INVENTION

This invention generally relates to power tools and particularly concerns air operated tools such as nut setters, screw drivers and the like for tightening threaded fasteners.

BACKGROUND OF THE INVENTION

The tightening of threaded fasteners commonly requires that a torque load applied to a fastener be within a prescribed tolerance range. Increasingly expanding use of assembled components has resulted in an ever increasing number of applications requiring utmost care in setting a wide variety of fasteners within stringent torque tolerance limits. Such increased demand for precisely torqued jobs has also resulted in additional need for a reliable, simplified system for indicating peak applied torque loading of the fastener and, frequently, for a continuous reading of instantaneous torque being delivered to a job under running load conditions.

On fixtured air tools, it has been known to obtain torque signals from reaction torque transducers. In a fixture, an air tool is restrained from turning, in reaction to the fastener which is being brought up to torque, by a flange at the front of the air tool which is bolted to the fixture. A reaction torque transducer is a tubular section with a flange at each end mounted between the motor flange and the fixture with strain gages bonded to the tubular section. Wires lead from the strain gages to a junction box on the fixture where an external measuring device or signal conditioner may be plugged in. As the tool runs down a fastener, torque builds up in the fastener and reaction torque builds up on the transducer. The strain gages are displaced elastically, changing their resistance to current flow. This change in resistance is measured, amplified and scaled for recording or display in units of torque. Sometimes, fixtured tools with reaction torque transducers re audited, using a portable meter. Other times, fixtured tools with reaction torque transducers are permanently hooked up to electronic display and/or recording devices, monitoring torque on each job.

Reaction torque transducers on single hand-held portable tools present other problems. Weight and size become immediately significant. Wires and connections become vulnerable and easily damaged. Tools may become larger and bulkier and their maintenance may become complex. Under certain circumstances, an operator can affect the torque signal by twisting the air tool. E.g., in the angle nutsetter with a reaction torque transducer placed in a long axis of the tool before the angle gears, twisting of the tool handle adds or subtracts from the signal. Costly and frequently cumbersome solutions have been suggested to avoid operator influence and/or to internally isolate such torque reaction transducers from the tool handle, but such solutions heretofore have not proven to be viable.

OBJECTS OF THE INVENTION

A primary object of this invention is to provide a new and improved system for measuring torque applied to a fastener by a rotary output of an air tool during an operating cycle of the tool wherein a motor air pressure signal is translated through a pressure transducer to indicate torque applied to a fastener.

A further object of this invention is to provide a new and improved system of the type described featuring a throughfeed internal motor air pressure signal transmitter within the air tool and connecting air supply components for effecting torque signal transmission. Included in this object is the aim of providing such a signal transmitter while requiring no increase whatsoever in size and bulk of the tool envelope itself and thereby optimizing the air tool for use as a portable handheld device which effectively protects the torque measuring components of the system against commonly encountered rough handling under demanding conditions.

Another object of this invention is to provide a new and improved torque measuring system particularly suited for quick-disconnect, as well as quick and easy reassembly, of the main air supply and motor air pressure signal, simultaneously, between the air supply hose and connected components such as the air tool.

Still another object of this invention is the provision of such a torque measuring system to be incorporated in an air tool and which is of a compact construction, quick and easy to manufacture and assemble for use with both new and existing air tools for verifying the torque load being applied thereby to a fastener.

Yet another object of this invention is to provide a new and improved method of measuring torque applied to a fastener during a fastener setting operation by sensing and measuring motor operating pressure with a pressure transducer connected to a motor inlet passage of the air tool.

A further object of this invention is to provide a method of the type described wherein the output reading of a torque indicator is made to read substantially zero under no-load free-running conditions such that a direct reading is obtained of the applied fastener torque responsive to increased motor operating pressure.

Other objects will be in part obvious and in part pointed out in more detail hereinafter.

A better understanding of the objects, advantages, features, properties and relations of this invention will be obtained from the following detailed description and accompanying drawings which set forth certain illustrative embodiments and are indicative of the various ways in which the principles of this invention are employed.

BRIEF DESCRIPTION OF THE DRAWINGS

In the drawings:

FIGS. 6A, 6B, 6C show graphical representations of output readings of individual pressure transducers of this invention and a reading of their combined output, for indicating instantaneous torque and rise time during an operating cycle of an air tool incorporating this invention.

DESCRIPTION OF THE PREFERRED EMBODIMENTS

Figure 1:
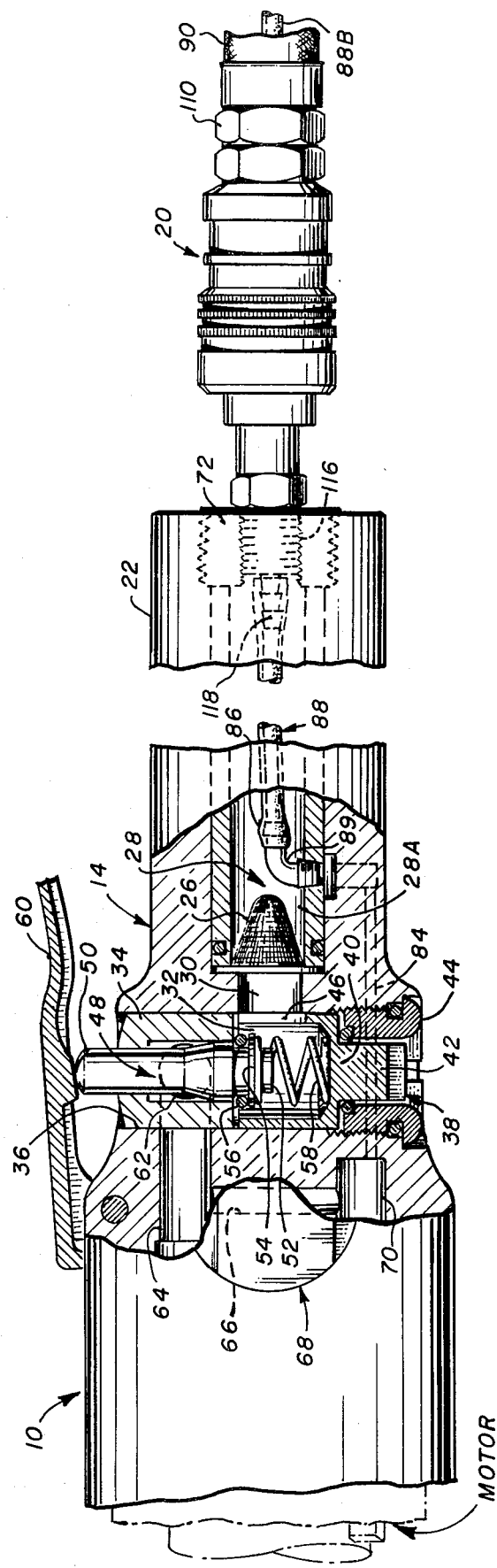
FIG. 1 is a fragmentary view, partly in section and partly broken away, showing an air tool incorporating an embodiment of a torque measuring system of this invention.

Referring in detail to the drawings, particularly that embodiment of the invention illustrated in FIGS. 1 and 3-5, an air tool 10 is shown having a conventional driving air motor. While not specifically illustrated, it will be understood that the air motor is of conventional design having rotatable vanes drivingly connected through conventional gearing, within housing 14 to a spindle supported for rotation by suitable bearings for rotating an output drive or work engaging element 16 which may be adapted for use with any one of a variety of standard toolholders, not shown, for tightening different types of fasteners, typically threaded fasteners, onto a workpiece.

Compressed air for driving the air motor is supplied from a suitable source 18 through a coupling 20 at the rear of a reduced diameter handle portion 22 of elongated cylindrical housing 14. The compressed air flows through a suitable inlet screen 26 in a passageway generally designated 28. Passageway 28 comprises a series of passages leading to the motor. An inlet passage 30 of passageway 28 communicates with a double diameter valve chamber 32 defined by a bushing 34 fixed in one end of a bore 36 extending across housing 14, and by an air regulator 38 closing the other end of the bore 36. The air regulator 38 includes an inner cup-like member 40 forming the larger end of chamber 32, having a shank portion 42 of reduced diameter received in a hollow plug 44 screwed into bore 36.

Inlet port 46 formed in the wall of air regulator member 38 serves to connect inlet passage 30 and valve chamber 32. A throttle valve 48 is received in chamber 32 having an outer stem 50 projecting through bushing 34. An inner end 52 of throttle valve 48 is enlarged relative to stem 50 and is provided with an annular flange 54. One side of flange 54 has an annular seal 56 seated thereon engageable with the inner end of bushing 34, and the other side of flange 54 serves as a seat for compresion spring 58 biased between flange 54 and member 40 to hold throttle valve 48 in normally closed position.

To actuate the motor, a hand lever 60, pivotally suppoted on housing 14 and engaging stem 50, is depressed to unseat seal 56 of throttle valve 48. Air then enters chamber 32 through inlet port 46 to pass through an outlet port 62 in bushing 34 communicating with an inlet passage 64 to passage 66 which will be understood to extend through a spool, not shown, of a normally open shutoff control 68 and into an inlet passage 70 to the motor.

Air tools of this type have speed characteristics which are in inverse relation to loading at the tool output and are usually designed to minimize loss in pressure from the full line supply pressure, at the inlet 72 of the handle portion 22, to the motor. However, there is always some reduction in pressure. Assuming that compressed air of relatively constant pressure is used to produce air flow to the motor under variable torque conditions, and also assuming the air supply system provides adequate flow capacity and a reliable pressure regulator such as at 74, line pressure should remain relatively constant whether or not the tool 10 is running. Running pressure of the motor may be about 60 percent of line pressure. Restrictions in the passageway 28 leading to the motor will cause a reduction in air flow to the motor which, when running free, has a relatively large air flow capacity. Since air flow is low and demand is high at free-running of the motor, its operating pressure is low. As the air motor is loaded, its air consumption decreases and the motor operating pressure increases. As the throttle lever 60 is depressed to actuate the air motor and any free movement of the work engaging element 16 is taken up, the torque of the motor builds up in response to increasing fastener load with a resultant build-up in pressure thereby slowing down the motor and reducing its air consumption. As the stall torque or preset shutoff torque in a shutoff type air tool is approached, air pressure builds in the motor inlet passage 70 and upon reaching stall or shutoff, inlet air pressure should about equal line pressure.

It has been found that by translating pressure at the motor inlet 70 to torque through a torque indicator 76 including a pressure transducer 78, that the readings taken from the output of the pressure transducer 78 compare closely with readings from a torque transducer, not shown, at the tool output 16 and that these readings track well when line pressure is changed by means of the pressure regulator 74. To provide desired monitoring of the rate of rise in air pressure caused by an increase in torque applied by the rotary output 16 of the tool 10 during a fastener setting, as well as measuring the peak fastener torque applied, determination of torque output by means of pressure transducer 78 connected to inlet passage 70 to the motor has been found to be particularly effective. Moreover, such a system is uniquely compatible not only with fixtured tools, but more significantly, with portable tools of the type illustrated since the resulting assembly is lightweight, of simplified construction and of a convenient size for the tool operator while being isolated from operator influence. In addition, the required connections in accordance with the torque indicating system of this invention may be made virtually invulnerable for effective protection against the rough handling so commonly encountered in the field applications of tools of this type.

Figure 5:
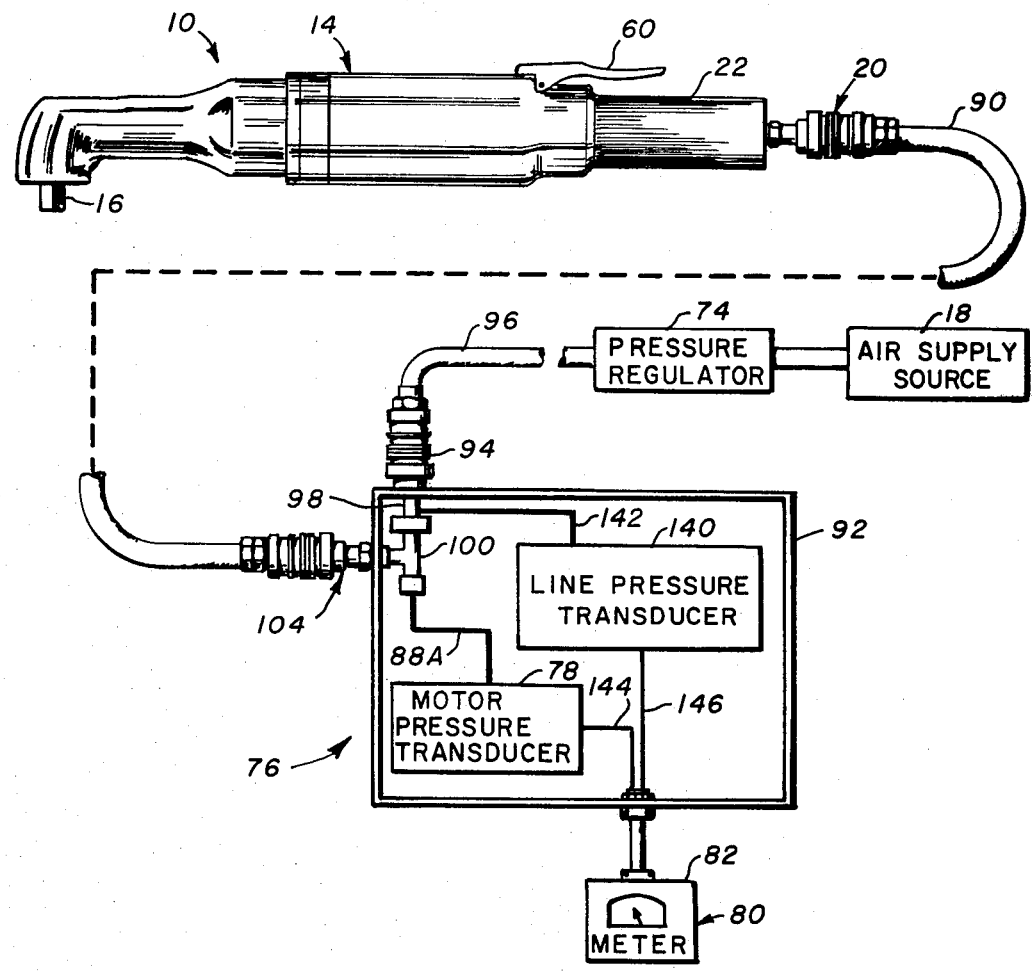
FIG. 5 is a reduced isometric view of the tool and torque measuring system of FIG. 1.

As best seen in FIG. 5, external torque indicator 76 is preferably shown located in remote relation to the air tool 10. The torque indicator 76 may include a continuous recorder or a meter such as illustrated at 80 or other suitable recording or display device, e.g., having an electronic analog readout calibrated in units of torque and which receives an electrical input signal from the output of a connected signal conditioning circuit, not shown, of the indicator 76. Details of suitable signal conditioning circuitry which has been found to perform satisfactorily are not specifically described herein. A variety of different circuits connected to an output signal of pressure transducer 78 of torque indicator 76 employed in accordance with this invention may be used to obtain a readout indicative of applied torque. It will be sufficient for an understanding of this invention to realize that signal conditioning circuitry may be mounted within the meter housing 82, e.g., and electrically connected to an output of a standard pressure transducer or a conventional multiple pressure transducer assembly designated generally at 78 wherein a plurality of standard pressure transducers are in bridged relation to one another to balance out and compensate for undesired forces such as torsion or bending and to measure only the deflection effected by an air pressure signal intended to be measured. As is known, a pressure transducer such as at 78 comprises a pressure cavity adapted to be connected to a conduit, having a terminal end which houses a strain gage-type diaphragm having suitable excitation input and output electrical wiring connecting the diaphragm to a signal conditioning circuit for readout. Upon being deflected in response to an increase in motor air pressure, which is a function of increased torque, the diaphragm of pressure transducer 78 exhibits a change in resistance to current flow indicative of the change in torque desired to be measured and displayed and/or recorded by torque indicator 76 to provide the desired torque signals for torque rate analysis and peak applied fastener torque. By virtue of the disclosed use of pressure transducer 78, the motor air pressure and change in that pressure accordingly may be measured, amplified and scaled by suitable signal conditioning circuitry for recording or display in units of torque.

In the embodiment of FIGS. 1 and 3–5, to provide the desired connection to obtain a motor air pressure signal downstream of throttle valve 48, a short passage 84 is formed in the air tool housing 14 connecting motor inlet passage 70 and a downstream end 28A of main passageway 28, whereby one end 86 of tubing 88 is secured by a suitable connector 89 and serves as a probe in direct communication with motor inlet passage 70 via passage 84. To eliminate any increase in size or bulk of the air tool 10 itself, the motor air pressure signal is particularly suited to be transmitted by tubing 88 located in its entirety internally within the air tool housing handle portion 22 and within a main air supply hose 90 to remote pressure transducer 78. The air pressure signal tubing 88 for transmitting signal air pressure at the motor inlet passage 70 extends longitudinally of the housing handle portion 22 rearwardly away from the motor from its terminal probe 86 and through a length of hose 90, say, 12 to 15 feet in length, to a junction box 92 housing certain signal conditioning components of torque indicator 76.

The junction box 92 has a coupling 94 for connection of a line 96, leading to the source 18 of supply air, to a conduit 98 within box 92 connected to a tee fitting 100 therein. The tee fitting 100 is connected to a coupling 104 for connecting the main air supply hose 90 to the junction box 92, and the signal tubing separates from the main air supply at the tee fitting 100 within junction box 92. Pressure signal tubing 88A is connected to pressure transducer 78 within junction box 92, and the output of transducer 78 is connected as noted above to a meter 80 or other display/store equipment through suitable signal conditioning circuitry.

Figure 4:
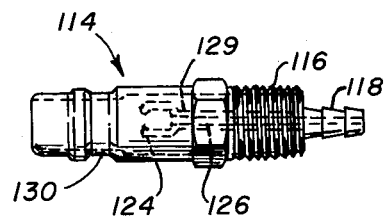

In accordance with yet another aspect of this invention, couplings 20 and 104 are dual quick-disconnect couplings provided for simultaneously connecting opposite ends of air supply hose 90 and its internal signal tubing 88B to the air tool handle inlet 72 and junction box 92. The couplings 20 and 104 are preferably substantially identical and of a type such as the DC-L series couplings made by Orsco Inc. of Troy, Michigan. It will suffice to describe one such as at the inlet 72 to the air housing handle portion 22. This coupling 20 (see FIGS. 3 and 4) includes a socket 106 having an externally threaded end 108 threadably connected via fitting 110 to air supply hose 90 and an internal concentric barbed fitting 112 which connects to internal signal tubing 88B within air supply hose 90. As illustrated in FIG. 4, a plug 114 is provided with an externally threaded end 116 which is screwed into tool inlet 72 at the rear handle portion 22 of the air tool housing 14 and surrounds a projecting hollow barbed fitting 118 connecting to internal signal tubing 88 within the air tool 10 leading to the pressure signal probe 86 at the motor inlet passage 70. A passage 120 is formed within socket 106 and extends between its barbed fitting 112 axially through a terminal male connector 122 which is registrable with a complementary female connector 124 confined within plug 114. A corresponding through passage 126 within plug 114 extends axially between female connector 124 and fitting 118 whereby the hollow socket 106 and plug 114 establish communication with tubing 88 within the air tool and tubing 88B within the main air supply hose 90 while providing for the through passage of supply air within the assembled socket 106 and plug 114 in their internal passageway such as at 127, 129 surrounding signal passages 120, 126.

A manually movable sleeve 128 is mounted on the outside of socket 106 for releasably securing an internal O ring seal, not shown, within a retaining groove 130 on the external wall of plug 114. Sleeve 128 is preferably maintained in position against accidental displacement on the socket 106 by a suitable bayonet type connection, not shown, although any releasable locking arrangement may be used to releasably secure socket 106 in position on plug 114. Upon turning sleeve 128 from its locking position through a predetermined angular displacement, sleeve 128 may then be displaced axially away from plug 114 into a release position wherein socket 106 may be axially disengaged from plug 114 to effect a quick-disconnect between air hose 90 and tool tubing 88, 88B carrying the motor pressure signal air. To effect connection, the socket 106 and plug 114 are re-engaged with connectors 122, 124 in registration, and the sleeve 128 is then moved axially toward plug 114 and angularly turned into its locking position to secure socket 106 to plug 114 with the male connector 122 in sealed seating engagement within female connector 124 to simultaneously connect the supply air and motor pressure signal air between the air supply hose 90 and the air tool 10.

It is to be understood that the coupling 104 provided between the air supply hose 90 and junction box 92 is substantially the same as that described above in connection with the coupling 20. If desired, coupling 94 between junction box 92 and the conduit 96 leading to the source 18 of supply air may be of a conventional quick-disconnect type. By virtue of the above described structure, each separate component, namely, the air tool 10, its air hose 90 and junction box 92 may be disconnected from the associated components for quick and easy servicing while permitting facile re-assembly.

Figure 2:
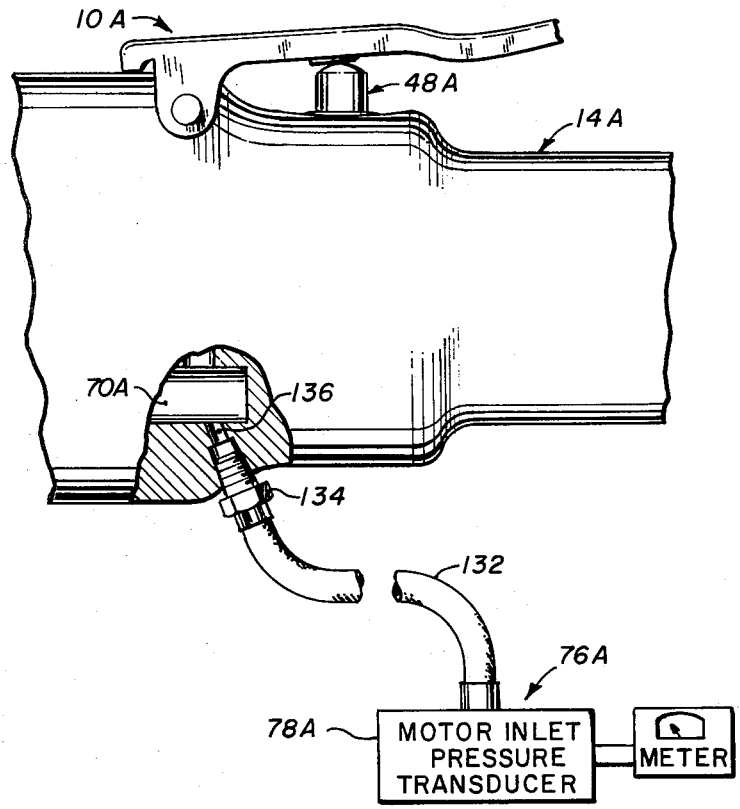
FIG. 2 is a fragmentary view, partly in section and partly broken away, showing an air tool incorporating another embodiment of a torque measuring system of this invention.
Figure 3:
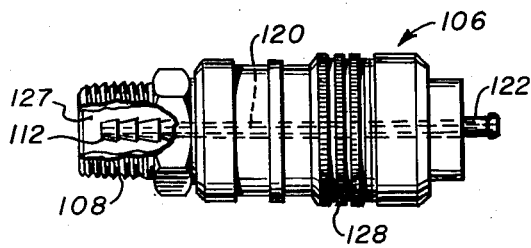
FIGS. 3 and 4 are enlarged views, partly broken away and partly in section, showing components of a coupling utilized in the embodiment of FIG. 1.

In the embodiment of FIG. 2, a torque indicator 76A of the type described above is illustrated as being located in a remote position from air tool 10A. Tubing 132 is coupled to air tool housing 14A adjacent motor inlet passage 70A by a suitable connector 134 secured within a radial passage 136 connecting with the motor inlet passage 70A downstream of the throttle valve 48A. The terminal end of tubing 132 serves as a probe and the tubing 132 itself serves as an air pressure signal transmitter connected to pressure transducer 78A of torque indicator 76A which converts pneumatic pressure into a mechanical display calibrated in foot/pounds torque to display and/or record torque and rise time after the throttle is depressed to energize the air motor. It has been found that with tubing 132 having a ⅛ inch inside diameter used to carry the inlet air signal, say, through a 15 foot length of tubing, e.g., to the torque indicator, that the flow is quite small and the frequency response is more than adequate, for tubing of such dimensions contains only about two cubic inches of air. No significant difference in readings has been obtained in a system which uses tubing of such long length and small inside diameter as opposed to a system wherein the pressure transducer 78A itself is connected adjacent the air tool housing 14A by a short tube, say, of only a few inches in length.

In certain instances, it may be desirable to provide a reading from the torque indicator which is responsive only to torque actually being applied to a fastener and which does not vary substantially from zero once the system is activated and to tool is running free under no load, whereby the readings above zero are indicative solely of increased pressure in the motor above its free-running no-load speed condition, and therefore indicative of torque applied to the fastener. In short, circumstances are contenplated wherein computer programs, e.g., handling torque signals from air tools may be more compatible with a system of the type herein disclosed if the output signals of this system are zero or substantially zero when the air tool is running free under no load.

As best seen in FIG. 6A, a graphical representation is shown of a millivolt output of a pressure transducer (such as 78) of this system plotted against time from zero until the air tool 10 incorporating this system is energized at point A, resulting in a positive millivolt reading at point B at free-running of the air motor. The signal from the pressure transducer 78 at the motor inlet 70 remains substantially constant for a delay period (for the time represented between points B-C) before the air motor is loaded at point C upon applying torque to the fastener job which terminates at point D upon stall or shutoff.

It has been found that the free-running pressure of the motor should remain relatively constant at about 60 percent of line pressure in a reliable air system with a good pressure regulator as noted above. To make the pressure transducer of this system initially read zero to reflect only torque applied to a fastener, it has been found that a signal conditioning circuit can be adjusted to provide a signal from a main supply air line pressure transducer such as at 140 (FIG. 5) with a negative polarity (FIG. 6B) which reads substantially the same as the motor inlet pressure transducer 78 reads from point B through point C (FIG. 6A) under free-running, no-load conditions of opposite positive polarity.

As best seen in FIG. 6C and FIG. 5, a main line air pressure signal is obtained via tubing 142 connecting conduit 98 to line pressure transducer 140. The above-described signals from motor inlet pressure transducer 78 and the main supply air line pressure transducer 140 are transmitted by suitable electrical output connections 144, 146 to the signal conditioning circuitry, not shown, where the signals are combined to provide a readout (FIG. 6C). Accordingly, the air tool output signal reads zero when it is free-running under no-load conditions at any setting of pressure regulator 74 whereby the combined pressure signal readout from transducers 78 and 140 is zero before fastener loading. As seen in FIG. 6C, the pressure signal reading rises only from point C to point D as the tool 10 is loaded to reflect torque actually applied to tighten a fastener.

By virtue of the foregoing disclosure, it will be seen that use of a pressure transducer for indicating torque, preferably in a remote location relative to the air tool itself, serves to achieve seemingly incompatible objectives of providing a readout of torque applied to a fastener by the output of the air tool without substantially changing size, bulk or weight of the air tool itself while also minimizing any operator inconvenience. By virtue of this system, the torque sensing and indicating components are effectively isolated and protected from rough handling to which such air tools are frequently subjected. The tool itself is freed in its entirety from the encumbrance of torque sensing and indicating equipment as well as from problems associated with carrying excitation current to transducers and signal current output from the transducers. Moreover, desired pneumatic connections are quickly and easily effected, particularly with the featured dual quick-disconnect couplings for simultaneously connecting and simultaneously disconnecting the supply air and the signal air in the disclosed through-feed, in-hose signal transmitting components. The above described embodiments of this invention are particularly suited to be incorporated in new or existing tools in a relatively inexpensive fashion for effectively obtaining transmission of signals indicative of torque applied to a fastener by the output of an air tool incorporating this system.

As will be apparent to persons skilled in the art, various modifications, adaptations and variations of the foregoing specific disclosure can be made without departing from the teachings of this invention.

I claim:

1. In an air tool for setting threaded fasteners to a desired torque and having a rotary air motor adapted to be energized to accelerate a rotary output of the motor to a predetermined free-running no-load speed and which decelerates in response to increased fastener resistance at a rate proportional to the rate of rise in motor air pressure caused by an increase in torque applied by the rotary output of the tool in setting a fastener, a torque measuring system comprising a torque indicator located in external remote relation to the air tool, tubing having one end serving as a probe located within the air tool for sensing motor air pressure, an air supply hose connected to the air tool, the tubing extending through an air supply passageway in the air tool and into the air supply hose to the torque indicator for delivering a motor air pressure signal to the torque indicator for sensing and indicating torque applied to a fastener by the rotary output of the tool, the torque indicator including a junction box having a pressure transducer mounted therein and air signal tubing connected thereto, the junction box including conduit therein connected to a supply of compressed air, a first quick-disconnect coupling between the air supply hose and the air tool for supplying air under pressure to said air supply passageway, the first coupling including a socket attached to one of the hose and air tool members and a complementary plug attached to the other of said members, the socket and plug having complementary internal connectors coupled to the tubing in the hose and air tool members of their respective socket and plug components, the internal connectors of the socket and plug being engageable in registered relation with one another for communicating the tubing in the air tool with the tubing in the air supply hose simultaneously upon connecting the socket and plug for establishing the supply air connection between the supply air hose and the air tool, the socket and plug and their internal connectors serving to simultaneously disconnect the supply air and the motor pressure signal air between the air supply hose and the air tool upon disconnecting said first coupling, and a second quick-disconnect coupling between the air supply hose and the junction box, the second coupling including a socket attached to one of the hose and box members and a complementary plug attached to the other of the said members, the socket and plug having complementary internal connectors coupled to the tubing in the hose and box members of their respective socket and plug components, the internal connectors of the socket and plug being engageable in registered relation with one another for communicating the tubing in the hose with the tubing in the junction box simultaneously upon connecting the socket and plug for establishing the supply air connection between the supply conduit of the junction box and the air hose, the socket and plug and their internal connectors serving to simultaneously disconnect the supply air and the motor pressure signal air to the pressure transducer upon disconnecting said second coupling between the air hose and junction box.

2. The torque measuring system of claim 1 further including a main supply air line for connection to the conduit within the junction box, and a third quick-disconnect coupling between the main supply air line and the conduit of the junction box including a socket attached to one of the line and conduit members and a complementary plug attached to the other thereof, the coupling component attached to the conduit being secured to the junction box for quick and easy disconnect and reassembly of the main supply air line to the junction box and its supply air conduit.

3. In an air tool for setting threaded fasteners to a desired torque and having a rotary air motor adapted to be energized to accelerate a rotary output of the motor to a predetermined free-running no-load speed and which decelerates in response to increased fastener resistance at a rate proportional to the rate of rise in motor air pressure caused by an increase in torque applied by the rotary output of the tool in setting a fastener, a torque measuring system comprising a torque indicator and an air pressure signal transmitter connected to the torque indicator for supplying a signal thereto for sensing and indicating torque applied to a fastener by the rotary output of the tool, the torque indicator including a pressure transducer and an indicator electrically connected in external remote relation to the air tool, the indicator being operable responsive to an electrical signal from the pressure transducer, the air pressure signal transmitter including tubing connected between an inlet to the air motor and the pressure transducer, the tubing serving to transmit a motor air pressure signal to the pressure transducer for actuating the pressure transducer and providing an output reading from the indicator, the torque indicator further including a second pressure transducer in external remote relation to the air tool, the second pressure transducer being electrically connected to the indicator with a polarity opposite that of the first pressure transducer, a supply air conduit for supplying air under pressure to the air motor being connected to the second pressure transducer serving to transmit a supply air pressure signal thereto, the supply air signal from the second pressure transducer providing a negative output reading from the indicator which when combined with the output of the first pressure transducer makes the indicator output read substantially zero under no-load free-running of the air motor and renders the indicator output reading responsive to increased motor operating pressure during fastener loading for providing a direct indication of the fastener torque applied.

4. A method of indicating torque applied to a threaded fastener by a rotary output of an air tool and comprising the steps of providing an air tool having a rotary air motor downstream of a throttle valve in an air supply passageway adapted to be energized by actuating the throttle valve to accelerate the rotary output of the motor to a predetermined free-running no-load speed and which decelerates in response to increased fastener resistance at a rate proportional to the rate of rise in motor air pressure caused by an increase in torque applied by the rotary output of the tool in setting a fastener, providing a torque indicator, including a pressure transducer, for sensing and indicating torque in response to a motor operating air pressure signal input which is proportional to torque applied by the air motor, supplying a motor air pressure signal input to the pressure transducer through tubing connecting the same to an inlet to the motor downstream of the throttle valve indicative of the operating motor pressure, displaying an output reading of the indicator in a location remote from the air tool itself, supplying an electrical signal through an electrical connection between an output of the pressure transducer and the indicator for energizing the indicator to provide the output reading, providing a second pressure transducer having an input connected to a main air supply line upstream of the air tool and an output electrically connected to the indicator for supplying a signal thereto with a polarity opposite that of the first motor inlet pressure transducer, combining the input signals to the indicator from the first and second pressure transducers to make the indicator read substantially zero when the air motor is under no-load free-running conditions, and providing a direct indication of fastener torque applied by the combined signal output of the indicator from the first and second pressure transducers responsive to increased motor operating pressure in excess of no-load free-running conditions during fastener loading.

* * * * *